US012272289B2

(12) United States Patent
Wang

(10) Patent No.: US 12,272,289 B2
(45) Date of Patent: Apr. 8, 2025

(54) DISPLAY COMPENSATION METHOD, DEVICE, SYSTEM, AND DISPLAY APPARATUS

(71) Applicant: Shenzhen China Star Optoelectronics Semiconductor Display Technology Co., Ltd., Guangdong (CN)

(72) Inventor: Limin Wang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/637,823

(22) PCT Filed: Jan. 11, 2022

(86) PCT No.: PCT/CN2022/071224
§ 371 (c)(1),
(2) Date: Feb. 24, 2022

(87) PCT Pub. No.: WO2023/123552
PCT Pub. Date: Jul. 6, 2023

(65) Prior Publication Data

US 2024/0428718 A1 Dec. 26, 2024

(30) Foreign Application Priority Data

Dec. 27, 2021 (CN) ......................... 202111614501.5

(51) Int. Cl.
*G09G 3/20* (2006.01)
*G09G 3/32* (2016.01)
(Continued)

(52) U.S. Cl.
CPC ............. *G09G 3/2092* (2013.01); *G09G 3/32* (2013.01); *G09G 3/3208* (2013.01); *G09G 3/36* (2013.01);
(Continued)

(58) Field of Classification Search
CPC ...... G09G 3/2092; G09G 3/32; G09G 3/3208; G09G 3/36; G09G 2320/0223; G09G 2320/0233
See application file for complete search history.

(56) References Cited

U.S. PATENT DOCUMENTS 7,145,522 B2 * 12/2006 Yamamoto ........... G09G 3/2942 345/60
9,892,686 B2 * 2/2018 Xu ....................... G09G 3/3258
(Continued)

FOREIGN PATENT DOCUMENTS

CN 1838215 9/2006
CN 102214440 10/2011
(Continued)

OTHER PUBLICATIONS

Notice of Reasons for Refusal Dated Feb. 6, 2024 From the Japan Patent Office Re. Application No. 2022-504213 and Its Translation Into English. (5 Pages).
(Continued)

*Primary Examiner* — Gene W Lee

(57) ABSTRACT

The present application relates to a display compensation method, including: performing an image identification process to display data to be compensated to obtain a display feature message; processing the display data to be compensated to obtain a display panel load coefficient; processing the display panel load coefficient and the display feature message to obtain a voltage drop compensation coefficient; and performing a compensation process to the display data to be compensated by the voltage drop compensation coefficient to obtain compensated display data to achieve compensation of display uniformity.

16 Claims, 6 Drawing Sheets

(51) Int. Cl.
*G09G 3/3208* (2016.01)
*G09G 3/36* (2006.01)

(52) U.S. Cl.
CPC ............... *G09G 2320/0223* (2013.01); *G09G 2320/0233* (2013.01)

(56) References Cited

U.S. PATENT DOCUMENTS

| | | | | |
|---|---|---|---|---|
| 10,276,090 | B2 * | 4/2019 | Park | G09G 3/3225 |
| 10,818,210 | B2 * | 10/2020 | Ma | G09G 3/20 |
| 10,885,840 | B2 | 1/2021 | Yamaguchi | |
| 2004/0257304 | A1 * | 12/2004 | Yamamoto | G09G 3/2942 345/60 |
| 2012/0236041 | A1 | 9/2012 | Oh | |
| 2016/0019838 | A1 | 1/2016 | Park | |
| 2016/0180815 | A1 * | 6/2016 | Pyo | G09G 3/2022 345/82 |
| 2017/0032742 | A1 | 2/2017 | Piper et al. | |
| 2018/0247605 | A1 * | 8/2018 | Zhang | G09G 3/3696 |

FOREIGN PATENT DOCUMENTS

| | | |
|---|---|---|
| CN | 103971635 | 8/2014 |
| CN | 104867455 | 8/2015 |
| CN | 110364111 | 10/2019 |
| CN | 111508404 | 8/2020 |
| WO | WO 2018/235372 | 12/2018 |

OTHER PUBLICATIONS

Notification of Office Action Dated Feb. 24, 2024 From The State Intellectual Property Office of the People's Republic of China Re. Application No. 202111614501.5 and Its Translation Into English. (11 Pages).

International Search Report and the Written Opinion Dated Aug. 25, 2022 From the International Searching Authority Re. Application No. PCT/CN2022/071224 and Its Translation Into English. (15 Pages).

Notification of Office Action and Search Report Dated Apr. 29, 2023 From The State Intellectual Property Office of the People's Republic of China Re. Application No. 202111614501.5 and Its Translation Into English. (24 Pages).

* cited by examiner

DISPLAY COMPENSATION METHOD, DEVICE, SYSTEM, AND DISPLAY APPARATUS

RELATED APPLICATIONS

This application is a National Phase of PCT Patent Application No. PCT/CN2022/071224 having International filing date of Jan. 11, 2022, which claims the benefit of priority of China Patent Application No. 202111614501.5 filed on Dec. 27, 2021. The contents of the above applications are all incorporated by reference as if fully set forth herein in their entirety.

FIELD AND BACKGROUND OF THE INVENTION

The present application relates to a field of display processes, especially to a display compensation method, a device, system, and a display apparatus.

Display technologies such as liquid crystal display (LCD), active-matrix organic light-emitting diode (AMOLED), and mini LED constantly develop and progress to bring increasingly rich display products and more colorful display applications. Uniformity of a display device is one of core indicators of the display device and directly influences performance of a display product. However, because of influence of process technologies, uniformity of the display device faces various challenges, and conventional solutions for improvement of uniformity of displays include electrical detection compensation, demura (brightness compensation) optical compensation, etc.

SUMMARY OF THE INVENTION

Technical Solution

As such, it is necessary to provide a display compensation method, a device, a system and a display apparatus able to mitigate display uniformity of a display device according to the issue that when a display device displays an image with high load, because a current in a display panel is large, an issue of uneven display occurs due to a voltage drop (IR Drop) resulting from an obvious impedance existing on OVDD and OVSS power source wirings, and a condition of the display uniformity would varies according to display panel load and display image characteristics such that the issue of uneven display still exists.

In a first aspect, the present application provides a display compensation method, including:

obtaining display data to be compensated;

performing an image identification process to the display data to be compensated to obtain a display feature message;

processing the display data to be compensated to obtain a display panel load coefficient when the display feature message fulfills an image compensation condition;

processing the display panel load coefficient and the display feature message to obtain a voltage drop compensation coefficient; and performing a compensation process to the display data to be compensated by the voltage drop compensation coefficient to obtain compensated display data.

In a second aspect, the present application provides a display compensation device, including:

a data obtaining module configured to obtain display data to be compensated;

an image identification module configured to perform an image identification process to the display data to be compensated to obtain a display feature message;

a load coefficient process module configured to process the display data to be compensated to obtain a display panel load coefficient when the display feature message fulfills an image compensation condition;

a compensation coefficient process module configured to process the display panel load coefficient and the display feature message to obtain a voltage drop compensation coefficient; and a display compensation module configured to perform a compensation process to the display data to be compensated by the voltage drop compensation coefficient to obtain compensated display data.

In a third aspect, the present application provides a display compensation system, display compensation system includes a controller configured to be connected to a display panel; wherein the controller is configured to perform steps as follows:

obtaining display data to be compensated;

performing an image identification process to the display data to be compensated to obtain a display feature message;

processing the display data to be compensated to obtain a display panel load coefficient when the display feature message fulfills an image compensation condition;

processing the display panel load coefficient and the display feature message to obtain a voltage drop compensation coefficient; and performing a compensation process to the display data to be compensated by the voltage drop compensation coefficient to obtain compensated display data.

Advantages

The above display compensation method, by obtaining display data to be compensated; performing an image identification process to the display data to be compensated to obtain a display feature message; when the display feature message fulfills the image compensation condition, processing the display data to be compensated to obtain a display panel load coefficient; processing the display panel load coefficient and the display feature message to obtain a voltage drop compensation coefficient; and performing a compensation process to the display data to be compensated by the voltage drop compensation coefficient to obtain compensated display data, which achieves compensation to display uniformity to further achieve uniform display of images. The present application by combining an image recognition technology and regionalized estimation of the load capacity, sets a differentiated dynamic voltage drop (IR Drop) compensation coefficient relating to display contents to further perform a compensation process to the display data to be compensated according to the voltage drop compensation coefficient, to output a compensated display time, achieves uniform display of images, and drastically improves display uniformity of the display device.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF SPECIFIC EMBODIMENTS OF THE INVENTION

To make the purpose, technical solutions and advantages of the present invention clearer, the present invention will be further described in detail below in conjunction with the accompanying drawings and embodiments. It should be understood that specific embodiments described here are only for explaining the present application but not for limiting the present application.

A conventional display driving framework inputs OVDD and OVSS power sources required for the display panel through a source chip on film (COF) bypass (tube legs of a source electrode flexible circuit board), and cooperates with a gate on array (GOA) circuit to implement scan driving. Most products are unilateral inputs, which facilitates designs of shapes of products and has a low cost. However in a conventional display driving framework, when a display device displays an image with high load, because a current in a display panel is large, an issue of uneven display occurs due to a voltage drop (IR Drop) resulting from an obvious impedance existing on OVDD and OVSS power source wirings, and a condition of the display uniformity would varies according to display panel load and display image characteristics, and a method of fixing compensation voltage or coefficient, such as demura, cannot be used for compensation.

Figure 1:
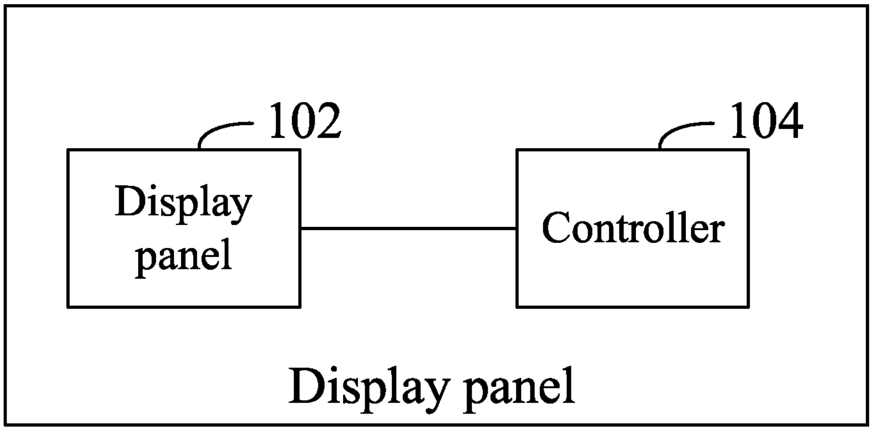
FIG. 1 is a schematic view of an application environment of a display compensation method of an embodiment of the present application.

The display compensation method provided by the present application can be applied to an application environment as shown in FIG. 1. The display apparatus includes a display panel 102 and a controller 104. The controller 104 can be configured to: obtain display data to be compensated; perform an image identification process to the display data to be compensated to obtain a display feature message; process the display data to be compensated to obtain a display panel load coefficient when the display feature message fulfills an image compensation condition; process the display panel load coefficient and the display feature message to obtain a voltage drop compensation coefficient; and perform a compensation process to the display data to be compensated by the voltage drop compensation coefficient to obtain compensated display data. The display panel 102 can be but is not limited to active-matrix organic light-emitting diode (AMOLED) display panel, AM Micro LED display panel, AM Mini LED display panel, or LCD display panel.

Figure 2:
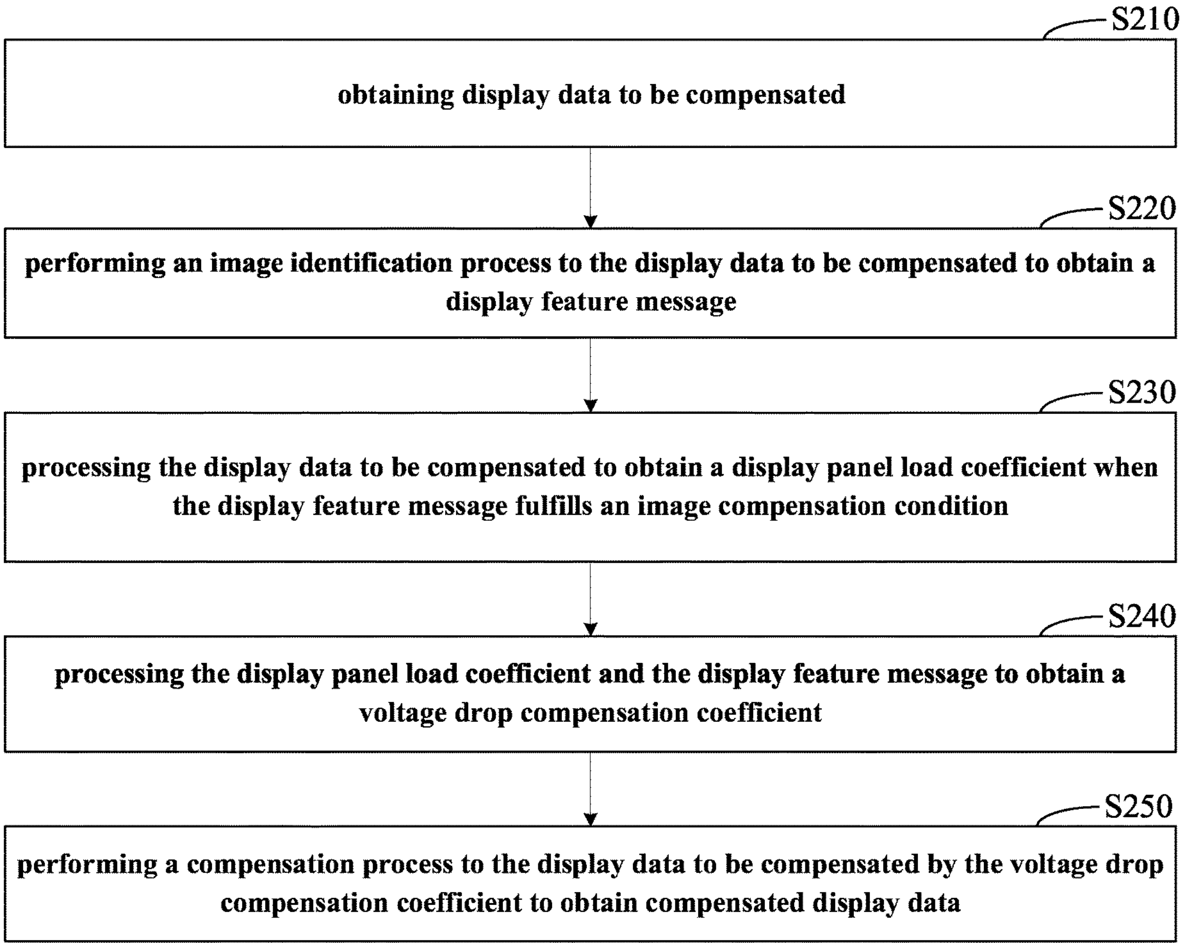
FIG. 2 is a first schematic flowchart of a display compensation method of the embodiment of the present application.

In an embodiment, with reference to FIG. 2, a display compensation method is provided, and the method applied to the controller 104 in FIG. 1 is used as an example for explanation. The method includes steps as follows:

A step S210 includes obtaining display data to be compensated.

The display data to be compensated refers to raw image data. The display data to be compensated can be raw full screen image data. For example, the controller can actively request data from a data input terminal to further obtain the display data to be compensated. Furthermore, the data input terminal, when receiving the display data to be compensated, can actively send the display data to be compensated to the controller such that the controller can receive the display data to be compensated.

In an example, the controller can monitor whether the data input terminal receives the display data to be compensated in real time. The data input terminal, when receiving the display data to be compensated, obtains the display data to be compensated in real time.

A step S220 includes performing an image identification process to the display data to be compensated to obtain a display feature message.

The display feature message can include displaying a boundary message. The controller can perform an image identification process to the display data to be compensated, for example, the controller can perform an identification process to a shape of a boundary of the display data to be compensated to further obtain a corresponding display feature message. For another example, the controller can perform an identification process to a grayscale of the display data to be compensated such that image grayscale data of the display data to be compensated can be identified.

A step S230 includes processing the display data to be compensated to obtain a display panel load coefficient when the display feature message fulfills an image compensation condition.

The controller can compare the display feature message obtained from processing to a predetermined feature message, and according to a processing result, and performs calculation of load capacity of the image when the display feature message fulfills the image compensation condition, namely, it performs a load calculation process to the display data to be compensated to further obtain a corresponding display panel load coefficient. The display panel load coefficient is a constant. display panel load coefficient can be configured to indicate a load condition of an image corresponding to the display data to be compensated.

For example, the controller can compare the display boundary message included by the display feature message to the predetermined boundary message and determine entirety and regularity of the display boundary message. For example, when the display boundary message has no clear boundary, a low entirety of the display boundary message is indicated. When the display boundary message is complicated and is irregular, a low regularity of the display boundary message is indicated. The controller, when detecting the entirety of the display boundary message greater than a predetermined threshold and the regularity of the display boundary message greater than the predetermined threshold, determines that the display feature message fulfills the image compensation condition, and processes the display data to be compensated to further obtain the display panel load coefficient.

It should be explained that predetermined boundary message can be stored in a data base in advance. When a load determination process needs to be performed on the display data to be compensated, the controller can inquire into the data base according to the display feature message, and determines whether display feature message fulfills image compensation adjustment according to an inquired comparison result.

A step S240 includes processing the display panel load coefficient and the display feature message to obtain a voltage drop compensation coefficient.

The controller can, based on an IR Drop compensation algorithm, processes the display panel load coefficient and the display feature message to further obtain the voltage drop compensation coefficient. The voltage drop compensation coefficient is a constant. It should be explained that different display data to be compensated corresponds to different voltage drop compensation coefficients.

For example, the controller can perform a process based on the display panel load coefficient and the display feature message to obtain voltage drop compensation coefficients of the whole screen. For example, one pixel point can correspond to one voltage drop compensation coefficient based on division of the pixel points.

A step S250 includes performing a compensation process to the display data to be compensated by the voltage drop compensation coefficient to obtain compensated display data.

The compensated display data refers to a compensated image data, and the compensated display data can be compensated full screen image data. The controller performs a compensation process to the display data to be compensated to obtain compensated display data according to the voltage drop compensation coefficient obtained by processing to further transmit compensated display data to the display panel. Optimized uniformity of the display image is achieved by the display panel displaying display images corresponding to the compensated display data.

In the above embodiment, by obtaining display data to be compensated; performing an image identification process to the display data to be compensated to obtain a display feature message; when the display feature message fulfills the image compensation condition, processing the display data to be compensated to obtain a display panel load coefficient; processing the display panel load coefficient and the display feature message to obtain a voltage drop compensation coefficient; and performing a compensation process to the display data to be compensated by the voltage drop compensation coefficient to obtain compensated display data, which achieves compensation to display uniformity to further achieve uniform display of images. The present application by combining an image recognition technology and regionalized estimation of the load capacity, sets a differentiated dynamic voltage drop (IR Drop) compensation coefficient relating to display contents to further perform a compensation process to the display data to be compensated according to the voltage drop compensation coefficient, to output a compensated display time, achieves uniform display of images, and drastically improves display uniformity of the display device.

In an embodiment, with reference to FIG. 3, a display compensation method is provided, the method is applied to the controller 104 in FIG. 1 as an example for explanation, the method includes steps as follows:

A step S310 includes obtaining display data to be compensated.

A step S320 includes performing an image identification process to the display data to be compensated to obtain a display feature message.

A step S330 includes processing the display data to be compensated to obtain the display panel load coefficient when the display feature message includes a full screen uniform image message.

The full screen uniform image message can be configured to indicate a corresponding display image as a full screen image.

For example, determination of whether the corresponding display feature message contains the full screen uniform image message can be performed according to a size and a shape of the boundary message in the display feature message. for example, the controller can obtain the display boundary message in the display feature message and process the display boundary message to determine whether the size and the shape of the image encompassed by the display boundary message fulfills predetermined size and shape, if fulfillment is achieved, then it is determined that the display feature message includes the full screen uniform image message. The controller performs a load calculation process to the display data to be compensated when the display feature message includes a full screen uniform image message to further obtain a display panel load coefficient corresponding to the full screen.

A step S340 includes processing the display panel load coefficient and the display feature message to obtain a voltage drop compensation coefficient.

A step S350 includes performing a compensation process to the display data to be compensated by the voltage drop compensation coefficient to obtain compensated display data.

Specific contents of the above step S310, step S320, step S340, and step S350 can refer to the contents of the above descriptions and will not be repeatedly described here.

In the above embodiment, the controller performs obtaining display data to be compensated; performing an image identification process to the display data to be compensated to obtain a display feature message; processing the display data to be compensated to obtain the display panel load coefficient when the display feature message comprises a full screen uniform image message corresponding to a full screen. The controller can process the display panel load coefficient and the display feature message based on a IR Drop compensation algorithm of a full screen, to obtain a voltage drop compensation coefficient corresponding to the full screen. As such, the controller performs a compensation process to the display data to be compensated by the voltage drop compensation coefficient to obtain the compensated display data, which achieves compensation to display uniformity to further achieve uniform display of images. The present application by combining an image recognition technology and regionalized estimation of the load capacity, sets a differentiated dynamic voltage drop (IR Drop) compensation coefficient relating to display contents to further perform a compensation process to the display data to be compensated according to the voltage drop compensation coefficient, to output a compensated display time, achieves uniform display of images, and drastically improves display uniformity of the display device.

In an embodiment, with reference to FIG. 4, a display compensation method is provided, the method is applied to the controller 104 in FIG. 1 as an example for explanation, the method includes steps as follows:

A step S410 includes obtaining display data to be compensated.

A step S420 includes performing an image identification process to the display data to be compensated to obtain a display feature message.

A step S430 includes processing the display data to be compensated to obtain the display panel load coefficient when the image boundary message is a non-full screen uniform image message and a boundary included by the image boundary message forms a closed region with a predetermined size.

The non-full screen uniform image message refers that the corresponding display image is a non-full screen image. The display feature message is an image boundary message. When a shape and a size constituted by a boundary included by the image boundary message does not satisfy requirements of a shape and a size of a full uniform image, it is determined that the image boundary message is a non-full screen uniform image message.

For example, it can be determined whether the corresponding display feature message includes a full screen uniform image message according to a size and a shape of a boundary message in the display feature message. for example, the controller can obtain the display boundary message in the display feature message, process the display boundary message, and determine whether a size and a shape of an image encompassed by the display boundary message fulfills predetermined size and shape, if no fulfillment, it is determined that the display feature message contains the non-full screen uniform image message. The controller, after determination of the image boundary message as the non-full screen uniform image message, further determines whether the boundary included by the image boundary message forms a closed region of the predetermined size, if the boundary included by the image boundary message forms the closed region of the predetermined size, a load calculation process is performed to the display data to be compensated to further obtain the display panel load coefficient of a corresponding region.

It should be explained that the controller can determine whether the boundary included by the image boundary message forms the closed region in advance, if the closed region is formed, it is determined that the closed region formed by the boundary is the predetermined size, for example, the size of the formed closed region reaches a predetermined size range, and it is determined that the image boundary message fulfills the image compensation condition. Furthermore, the controller can also perform a shape regularity determination to the closed region of the boundary, of the shape regularity of the closed region formed by the boundary fulfills a predetermined requirement, then it is determined that the image boundary message fulfills the image compensation condition to further perform a load calculation process to the display data to be compensated to further obtain the display panel load coefficient of a corresponding region.

In an example, the controller, when determining that the image boundary message is the non-full screen uniform image message and the boundary included by the image boundary message is complicated and irregular, or no clear boundary and non-high grayscale full screen image, does not activate voltage drop compensation.

A step S440 includes processing the display panel load coefficient and the display feature message to obtain a voltage drop compensation coefficient.

A step S450 includes performing a compensation process to the display data to be compensated by the voltage drop compensation coefficient to obtain compensated display data.

Specific contents and processes of the above step S410, step S420, step S440, and step S450 can refer to the above contents and are repeatedly described here.

In the above embodiment, the controller performs obtaining display data to be compensated; performing an image identification process to the display data to be compensated to obtain a display feature message; processing the display data to be compensated to obtain a regional display panel load coefficient when the image boundary message is a non-full screen uniform image message and a boundary included by the image boundary message forms a closed region with a predetermined size. The controller can process the display panel load coefficient and the display feature message based on an IR Drop compensation algorithm of a corresponding region to further obtain a voltage drop compensation coefficient of a corresponding region. Further, the controller performs a compensation process to the display data to be compensated by the voltage drop compensation coefficient to obtain compensated display data, which achieves compensation to display uniformity to further achieve uniform display of images. The present application by combining an image recognition technology and regionalized estimation of the load capacity, sets a differentiated dynamic voltage drop (IR Drop) compensation coefficient relating to display contents to further perform a compensation process to the display data to be compensated according to the voltage drop compensation coefficient, to output a compensated display time, achieves uniform display of images, and drastically improves display uniformity of the display device.

In an example, the step of performing the compensation process to the display data to be compensated by the voltage drop compensation coefficient to obtain compensated display data comprises:

adjusting an image data voltage of the display data to be compensated according to the voltage drop compensation coefficient to obtain the compensated display data.

The image data voltage refers to a Vdata voltage. The controller can adjust the image data voltage of the display data to be compensated according to the voltage drop compensation coefficient obtained from process in to obtain the compensated display data. Namely, by adjusting a value of Vdata in different locations, compensation of display uniformity is achieved.

In an example, the voltage drop compensation coefficient 包括 positive voltage drop compensation coefficient and/or negative voltage drop compensation coefficient.

For example, a large size AMOLED display device driver inputted by a unilateral power source is used as an example for explanation, both the OVDD and OVSS power source are connected upward to each pixel through bottom side wide wirings (shorting bar). Therefore, a basic condition of the IR drop deteriorates from a bottom side to a top side gradually and results in a top end displays a lowered brightness when the display panel has display of a large load to influence uniformity. The present application, by image identification and load determination, analyzes image characteristics of the display image to be compensated, sets different voltage drop compensation coefficients according to different image identification and determination results, processes the display data to be compensated, and performs a gradient Vdata debug lift according to the voltage drop compensation coefficient to further achieve improvement of the display uniformity.

It should be explained that uniformity can also be improved by lowering a display data voltage of a bottom end to further achieve improvement of the display uniformity.

In the above display compensation method, by combining an image recognition technology and regionalized estimation of the load capacity, sets a differentiated dynamic voltage drop (IR Drop) compensation coefficient relating to display contents to further perform a compensation process to the display data to be compensated according to the voltage drop compensation coefficient, to output a compensated display time, achieves uniform display of images, and drastically improves display uniformity of the display device.

It should be explained that a setting of the voltage drop compensation coefficient is set according to the display panel load coefficient and the display feature message. Furthermore, voltage drop compensation coefficient can also be designed according to a design of a display panel wiring layout, and settings, such as brightness setting and process technology capability, are required to be debugged and optimized according to demands on products.

Figure 3:
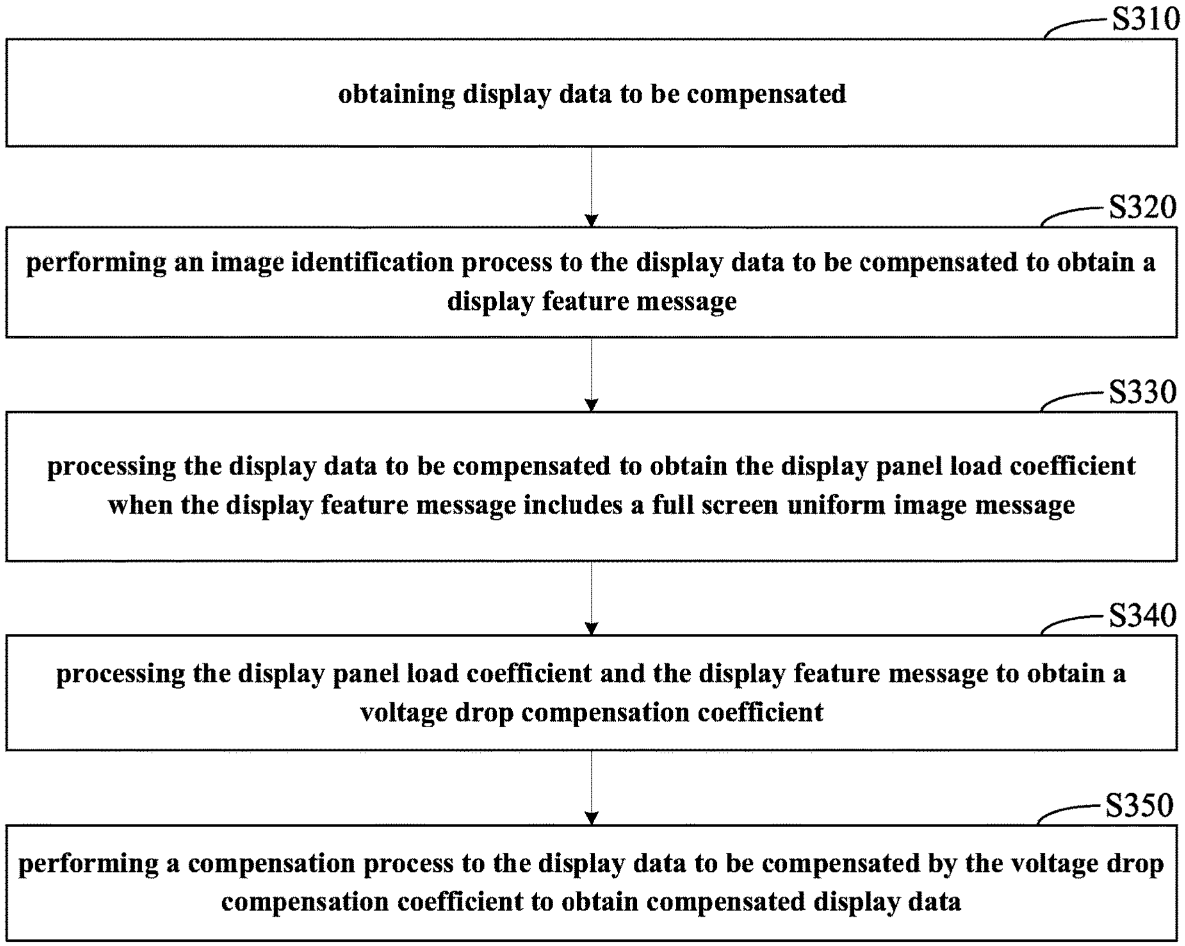
FIG. 3 is a second schematic flowchart of the display compensation method in the embodiment of the present application.
Figure 4:
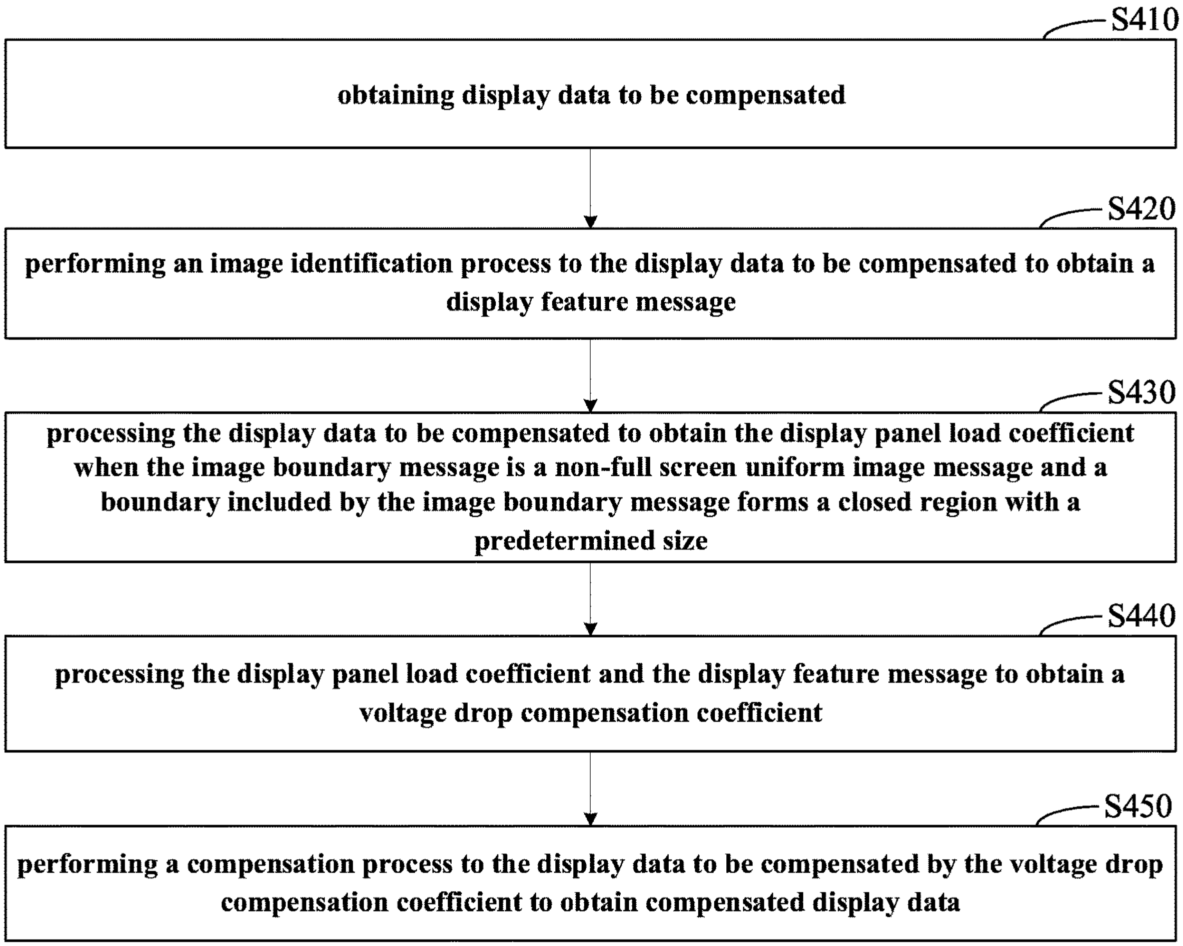
FIG. 4 is a third schematic flowchart of the display compensation method in the embodiment of the present application.

It should be understood that although each step in flowcharts in FIGS. 2 to 4 are shown sequentially according to indications of arrows, these steps are not necessarily implemented according to the sequence as indicated by the arrows. Unless the specification has clear indications, a sequence of implementation of these steps has no strict limit, these steps can be implemented in other sequence. Furthermore, at least one part of the steps in FIGS. 2 to 4 can comprise a plurality of sub-steps or a plurality of phases, and these sub-steps or phases are not necessarily implemented and completed at the same time, but can be implemented in different times. A sequence of implementation of these sub-steps or phases is not necessarily in turn, but these sub-steps or phases can be implemented alternately or in turn with other steps or sub-steps of other steps, or at least one part of the phases.

Figure 5:
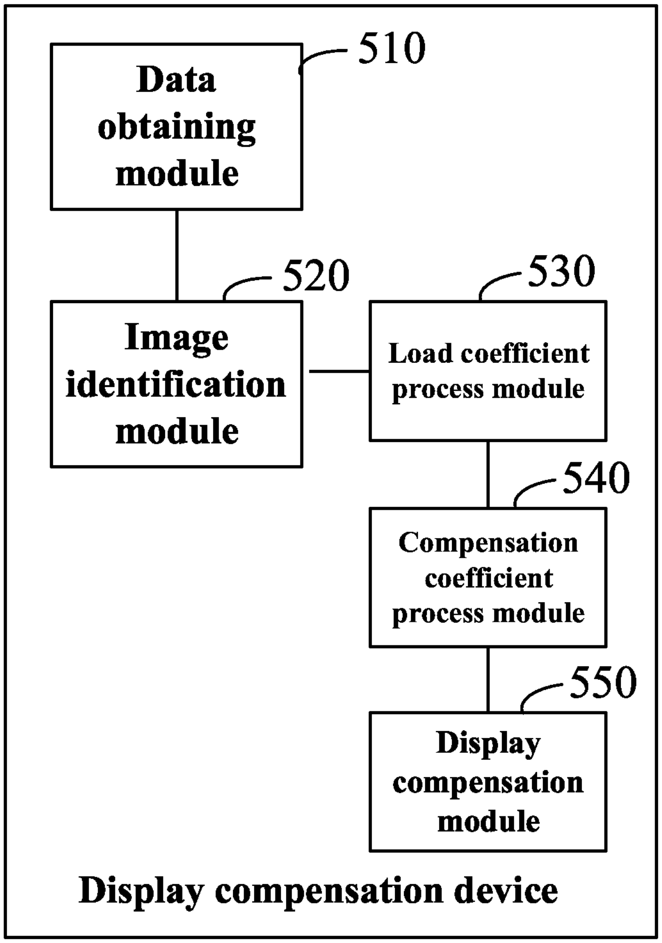
FIG. 5 is a structural diagram of a display compensation device in the embodiment of the present application.

In an embodiment, with reference to FIG. 5, a display compensation device is provided and includes modules as follows:

A data obtaining module 510 is configured to obtain display data to be compensated.

An image identification module 520 is configured to perform an image identification process to the display data to be compensated to obtain a display feature message.

A load coefficient process module 530 is configured to process the display data to be compensated to obtain a display panel load coefficient when the display feature message fulfills an image compensation condition.

A compensation coefficient process module 540 is configured to process the display panel load coefficient and the display feature message to obtain a voltage drop compensation coefficient.

A display compensation module 550 is configured to perform a compensation process to the display data to be compensated by the voltage drop compensation coefficient to obtain compensated display data.

In an example, the load coefficient process module 530 is further configured to:

process the display data to be compensated to obtain the display panel load coefficient when the display feature message comprises a full screen uniform image message.

In an example, the load coefficient process module 530 is further configured to:

process the display data to be compensated to obtain the display panel load coefficient when the image boundary message is a non-full screen uniform image message and a boundary included by the image boundary message forms a closed region with a predetermined size.

In an example, the display compensation module 550 is further configured to:

adjusting an image data voltage of the display data to be compensated according to the voltage drop compensation coefficient to obtain the compensated display data.

In an example, the voltage drop compensation coefficient includes a positive voltage drop compensation coefficient and/or a negative voltage drop compensation coefficient.

In the above embodiment, the display data to be compensated is obtained by the data obtaining module; the image identification module performs an image identification process to the display data to be compensated to obtain a display feature message; the load coefficient process module processes the display data to be compensated to obtain a display panel load coefficient when the display feature message fulfills an image compensation condition; the compensation coefficient process module processes the display panel load coefficient and the display feature message to obtain a voltage drop compensation coefficient; the display compensation module performs a compensation process to the display data to be compensated by the voltage drop compensation coefficient to obtain compensated display data, which achieves compensation to display uniformity to further achieve uniform display of images. The present application by combining an image recognition technology and regionalized estimation of the load capacity, sets a differentiated dynamic voltage drop (IR Drop) compensation coefficient relating to display contents to further perform a compensation process to the display data to be compensated according to the voltage drop compensation coefficient, to output a compensated display time, achieves uniform display of images, and drastically improves display uniformity of the display device.

Regarding specific limitations of the display compensation device, limits of the above descriptions to display compensation method can be referred to, and will not be described repeatedly here. Each module in the above display compensation device can be implemented partially or completely through software, hardware, or a combination of software and hardware. Each module as above can be, in form of hardware, embedded in or individual from the controller in the display compensation system, and can be, in form of software, stored in the memory in the display compensation system for the controller to call each module as above for corresponding operation.

In an embodiment, a display compensation system is also provided. The display compensation system comprises a controller configured to connect the display panel. the controller is configured to perform the steps of any one of the above display compensation methods.

In an example, the controller, when performing a computer program, also performs steps as follows:

obtaining display data to be compensated; performing an image identification process to the display data to be compensated to obtain a display feature message; processing the display data to be compensated to obtain a display panel load coefficient when the display feature message fulfills an image compensation condition; processing the display panel load coefficient and the display feature message to obtain a voltage drop compensation coefficient; and performing a compensation process to the display data to be compensated by the voltage drop compensation coefficient to obtain compensated display data.

In an example, the controller, when implementing the computer program, can also perform a step as follows:

processing the display data to be compensated to obtain the display panel load coefficient when the display feature message comprises a full screen uniform image message.

In an example, the controller, when implementing the computer program, can also perform a step as follows:

processing the display data to be compensated to obtain the display panel load coefficient when the image boundary message is a non-full screen uniform image message and a boundary included by the image boundary message forms a closed region with a predetermined size.

In an example, the controller, when implementing the computer program, can also perform a step as follows:

adjusting an image data voltage of the display data to be compensated according to the voltage drop compensation coefficient to obtain the compensated display data.

In the above embodiment, by obtaining the display data to be compensated; performing an image identification process to the display data to be compensated to obtain a display feature message; when the display feature message fulfills the image compensation condition, processing the display data to be compensated to obtain a display panel load coefficient; processing the display panel load coefficient and the display feature message to obtain a voltage drop compensation coefficient; and performing a compensation process to the display data to be compensated by the voltage drop compensation coefficient to obtain compensated display data, which achieves compensation to display uniformity to further achieve uniform display of images. The present application by combining an image recognition technology and regionalized estimation of the load capacity, sets a differentiated dynamic voltage drop (IR Drop) compensation coefficient relating to display contents to further perform a compensation process to the display data to be compensated according to the voltage drop compensation coefficient, to output a compensated display time, achieves uniform display of images, and drastically improves display uniformity of the display device.

Figure 6:
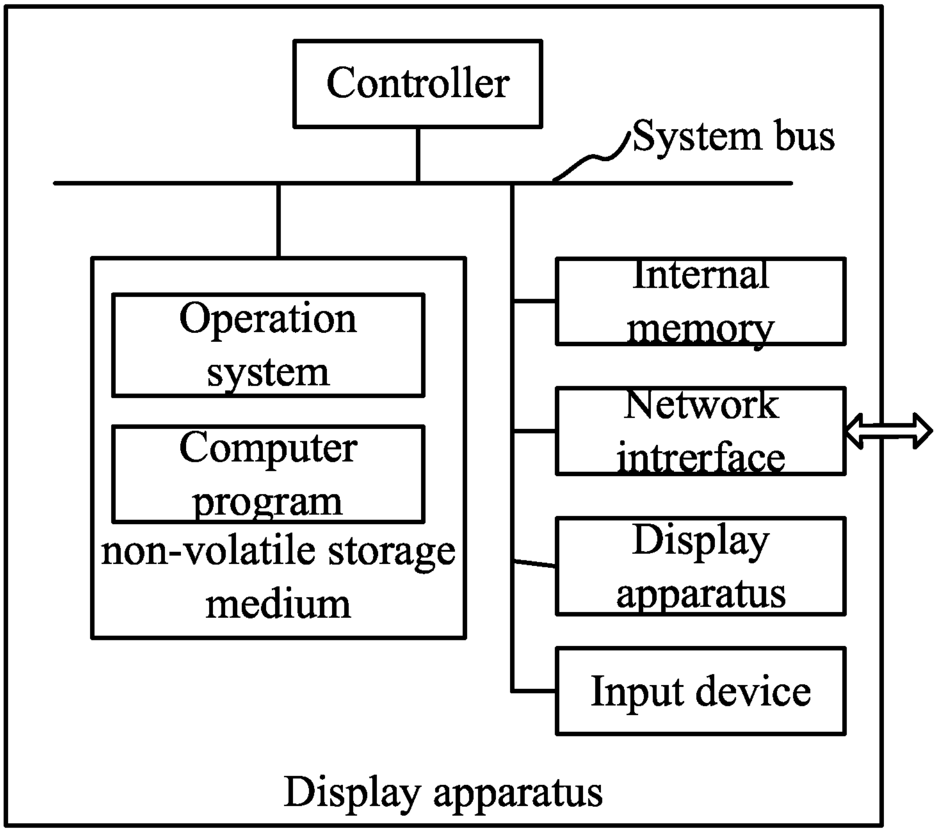
FIG. 6 is an internal structural diagram of the display apparatus in the embodiment of the present application.

In an embodiment, a display apparatus is provided. The display apparatus can be but is not limited to an AMOLED display apparatus, an AM Micro LED display apparatus, an AM Mini LED display apparatus, or a LCD display apparatus. An internal structural diagram of the display apparatus can be as shown in FIG. 6. The display apparatus includes a display compensation system and a display panel. The display compensation system includes a controller and memory connected through a system bus. The display panel can also include an internet interface and an input device. The controller of the display compensation system is configured to prove calculation and control abilities. The memory of the display compensation system includes a non-volatile storage medium and an internal memory. The non-volatile storage medium is stored with an operation system and a computer program. The internal memory provides the operation system and the computer program in the non-volatile storage medium with an environment. The internet interface of the display panel is configured to connect and communicate with an external terminal through a network. The computer program, when implemented by a processor, performs a display compensation method. The display panel can be but is not limited to an AMOLED display panel, an AM Micro LED display panel, an AM Mini LED display panel, or a LCD display panel.

A person of ordinary skill in the art can understand that the structure as shown in FIG. 6 is only a structural block diagram related to the present application solution, and is not form a limit to a display apparatus to which the present application solution is applied to. A specific display apparatus can include parts more or less than shown in the figures, or a combination of some parts, or include a different arrangement of parts.

In an embodiment, a computer-readable storage medium is provided, a computer program is stored in the computer-readable storage medium. The computer program, when implemented by a processor, performs steps as follows:

obtaining display data to be compensated; performing an image identification process to the display data to be compensated to obtain a display feature message; processing the display data to be compensated to obtain a display panel load coefficient when the display feature message fulfills an image compensation condition; processing the display panel load coefficient and the display feature message to obtain a voltage drop compensation coefficient; and performing a compensation process to the display data to be compensated by the voltage drop compensation coefficient to obtain compensated display data.

A person of ordinary skill in the art can understand that implementation of all or parts of steps in the above embodiment method can be completed by a computer program instructing related hardware. The computer program can be stored in a non-volatile computer-readable storage medium. The computer program, when implemented, can include steps of the embodiments of each above method. Any referral to memory, storage, data base, or other medium used by each embodiment provided by the present application can include non-volatile and/or volatile memory. The non-volatile memory can include a read-only memory (ROM), a programmable ROM (PROM), an electrically programmable ROM (EPROM), an electrically-erasable programmable ROM (EEPROM), or a flash random access memory (RAM). The volatile memory can include a random access memory (RAM) or an external high speed buffer memory. As explanation instead of limits, the RAM can be in various types such as static RAM (SRAM) dynamic RAM (DRAM), synchronous DRAM (SDRAM), double data rate SDRAM (DDRSDRAM), enhanced SDRAM (ESDRAM), synclink dynamic RAM (SLDRAM), Rambus dynamic RAM (RDRAM), direct rambus dynamic RAM (DRDRAM), and rambus dynamic RAM (RDRAM).

Technical features of the above embodiments can be combined randomly. To make the description concise, not all possible combinations of the technical features in the above embodiments are described. However, combinations of these technical features should be deemed as within a range of descriptions of the specification as long as no conflict exists.

The above embodiments only indicate several embodying ways of the present application, descriptions thereof are more specific and detailed but cannot be understood as a limit to claims. It should be pointed out that for a person of ordinary skill in the art, under a precondition not departing from ideas of the present application, several variants and improvements can also be made and these all belong to a protective scope of the present application. Therefore, the patent protective scope of the present application should be based on the attached claims.

What is claimed is:

1. A display compensation method, comprising:

obtaining display data to be compensated;

performing an image identification process to the display data to be compensated to obtain a display feature message;

processing the display data to be compensated to obtain a display panel load coefficient when the display feature message fulfills an image compensation condition;

processing the display panel load coefficient and the display feature message to obtain a voltage drop compensation coefficient; and performing a compensation process to the display data to be compensated by the voltage drop compensation coefficient to obtain compensated display data.

2. The display compensation method according to claim 1, wherein the step of processing the display data to be compensated to obtain the display panel load coefficient when the display feature message fulfills the image compensation condition, comprises:

processing the display data to be compensated to obtain the display panel load coefficient when the display feature message comprises a full screen uniform image message.

3. The display compensation method according to claim 2, wherein the display feature message is an image boundary message, and the step of processing the display data to be compensated to obtain the display panel load coefficient when the display feature message fulfills the image compensation condition, comprises:

processing the display data to be compensated to obtain the display panel load coefficient when the image boundary message is a non-full screen uniform image message and a boundary included by the image boundary message forms a closed region with a predetermined size.

4. The display compensation method according to claim 1, wherein the step of performing the compensation process to the display data to be compensated by the voltage drop compensation coefficient to obtain compensated display data, comprises:

adjusting an image data voltage of the display data to be compensated according to the voltage drop compensation coefficient to obtain the compensated display data.

5. The display compensation method according to claim 4, wherein the voltage drop compensation coefficient comprises a positive voltage drop compensation coefficient and/or a negative voltage drop compensation coefficient.

6. A display compensation system, comprising a controller configured to be connected to a display panel; wherein the controller is configured to perform steps as follows:

obtaining display data to be compensated;

performing an image identification process to the display data to be compensated to obtain a display feature message;

processing the display data to be compensated to obtain a display panel load coefficient when the display feature message fulfills an image compensation condition;

processing the display panel load coefficient and the display feature message to obtain a voltage drop compensation coefficient; and performing a compensation process to the display data to be compensated by the voltage drop compensation coefficient to obtain compensated display data.

7. The display compensation system according to claim 6, wherein the step of processing the display data to be compensated to obtain the display panel load coefficient when the display feature message fulfills the image compensation condition, comprises:

processing the display data to be compensated to obtain the display panel load coefficient when the display feature message comprises a full screen uniform image message.

8. The display compensation system according to claim 7, wherein the display feature message is an image boundary message, and the step of processing the display data to be compensated to obtain the display panel load coefficient when the display feature message fulfills the image compensation condition, comprises:

processing the display data to be compensated to obtain the display panel load coefficient when the image boundary message is a non-full screen uniform image message and a boundary included by the image boundary message forms a closed region with a predetermined size.

9. The display compensation system according to claim 6, wherein the step of performing the compensation process to the display data to be compensated by the voltage drop compensation coefficient to obtain compensated display data, comprises:

adjusting an image data voltage of the display data to be compensated according to the voltage drop compensation coefficient to obtain the compensated display data.

10. The display compensation system according to claim 9, wherein the voltage drop compensation coefficient comprises a positive voltage drop compensation coefficient and/or a negative voltage drop compensation coefficient.

11. A display apparatus, comprising a display panel and a display compensation system; wherein the display compensation system is connected to the display panel; and wherein the display compensation system comprises a controller configured to be connected to the display panel, and the controller is configured to perform steps as follows:

obtaining display data to be compensated;

performing an image identification process to the display data to be compensated to obtain a display feature message;

processing the display data to be compensated to obtain a display panel load coefficient when the display feature message fulfills an image compensation condition;

processing the display panel load coefficient and the display feature message to obtain a voltage drop compensation coefficient; and performing a compensation process to the display data to be compensated by the voltage drop compensation coefficient to obtain compensated display data.

12. The display apparatus according to claim 11, wherein the step of processing the display data to be compensated to obtain the display panel load coefficient when the display feature message fulfills the image compensation condition, comprises:

processing the display data to be compensated to obtain the display panel load coefficient when the display feature message comprises a full screen uniform image message.

13. The display apparatus according to claim 12, wherein the display feature message is an image boundary message, and the step of processing the display data to be compensated to obtain the display panel load coefficient when the display feature message fulfills the image compensation condition, comprises:

processing the display data to be compensated to obtain the display panel load coefficient when the image boundary message is a non-full screen uniform image message and a boundary included by the image boundary message forms a closed region with a predetermined size.

14. The display apparatus according to claim 11, wherein the step of performing the compensation process to the display data to be compensated by the voltage drop compensation coefficient to obtain compensated display data, comprises:

adjusting an image data voltage of the display data to be compensated according to the voltage drop compensation coefficient to obtain the compensated display data.

15. The display apparatus according to claim 14, wherein the voltage drop compensation coefficient comprises a positive voltage drop compensation coefficient and/or a negative voltage drop compensation coefficient.

16. The display apparatus according to claim 11, wherein the display panel is an active matrix organic light emitting diode (AMOLED) display panel, an AM micro LED display panel, an AM mini LED display panel, or a liquid crystal display (LCD) panel.

* * * * *